PULSED DOPPLER RADAR SYSTEMS
Filed Dec. 11, 1967
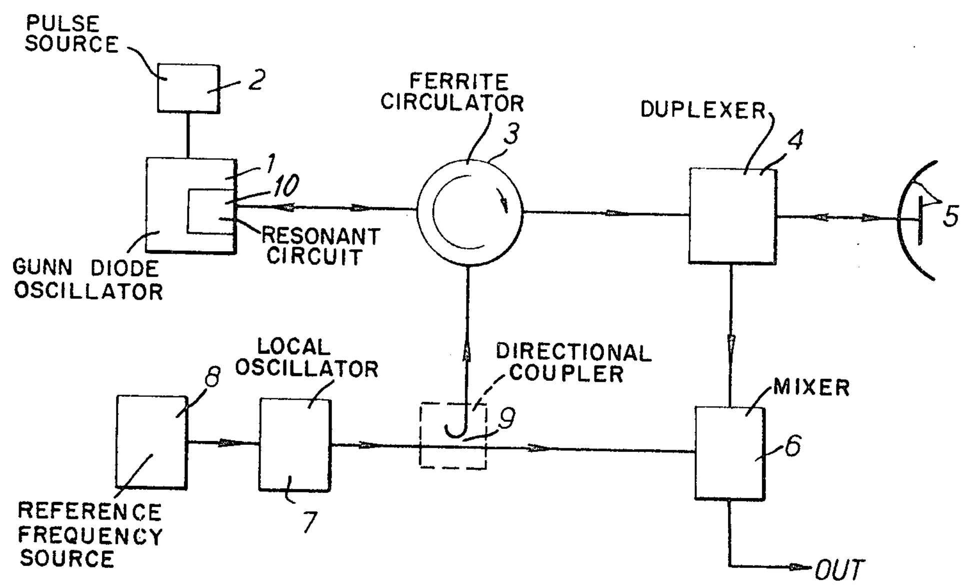
Inventors:
Kenneth Alfred James Warren
and
William Oliver Agar
BY
Baldwin Wight Diller & Brown
ATTORNEYS United States Patent Office 3,454,946
Patented July 8, 1969

3,454,946

PULSED DOPPLER RADAR SYSTEMS

Kenneth Alfred James Warren, Great Baddow, and William Oliver Agar, Danbury, England, assignors to The Marconi Company Limited, London, England, a British company Filed Dec. 11, 1967, Ser. No. 689,687
Claims priority, application Great Britain, Jan. 25, 1967, 3,832/67
Int. Cl. G01s 7/28
U.S. Cl. 343—17.1 3 Claims

ABSTRACT OF THE DISCLOSURE

A Doppler radar system having a pulsed microwave oscillator linked to an aerial by a circulator and a duplexer, a local oscillator driven from a stable reference frequency which leads parts of its signal to the microwave oscillator via the circulator to produce injection phase priming and the remainder to a mixer which receives another input from the duplexer and produces a desired intermediate frequency output. The operational frequency of the transmitter being the local oscillator frequency plus (or minus) the intermediate frequency. The microwave oscillator may be of the Gunn diode type.

This invention relates to pulsed Doppler radar systems.

The output from the transmitter of a pulsed Doppler radar system should , ideally, be a wave train consisting of time-spaced sections, each of length equal to the desired pulse length and each commencing at a time which is time-spaced from the beginning of the immediately preceding pulse by exactly the pulse repetition period. In other words, ideally, the phase of the radio frequency signal at the beginning of each pulse should be related directly to the phase of the radio frequency signal at the end of the preceding pulse by an amount determined by the radio signal frequency and the time interval between the end of one pulse and the beginning of the next. In practice it is sufficient to establish an arbitrary constant relationship between the phase at the beginning of one pulse and that at the beginning of the next.

Because of the foregoing requirement considerable difficulties are met when attempts are made to use a pulsed microwave oscillator as the transmitter of a pulsed Doppler radar system beccause, owing to the random starting processes of such oscillators (the oscillation built up is, in the first instance, triggered by circuit noise), the foregoing pulse-to-pulse phase requirement is not met. It is known, however, that these difficulties can be overcome by utilising the principle of "injection phase priming" i.e. injecting into the resonant circuit or device of the oscillator a continuous wave signal of the same frequency but having a magnitude many times larger than that of circuit noise. If this is done the radio frequency phase at the commencement of a pulse will no longer be random but will be related to the phase of the continuous signal which is injected. The object of the present invention is to provide improved and relative simple pulsed Doppler radar systems in which injection phase priming is employed to enable pulsed microwave oscillators to be used in the transmitters of said systems and to satisfy the aforesaid pulse-to-pulse phase requirement when so used.

According to this invention a pulsed Doppler radar system comprises a microwave oscillator having a radio freqency resonant circuit or device and constituting the transmitter of the system; a channel including a circulator having at least three ports connecting said microwave oscillator to radiating means; a local oscillator arranged and connected to translate received reflected radio frequency oscillations into an intermediate frequency; and means for also injecting oscillations from said local oscillator into said resonant circuit or device via said circulator at sufficient strength to produce injection phase priming, the operating frequency of the transmitter being adjusted to be equal to the local oscillator frequency plus (or minus) the intermediate frequency.

Preferably the micro-wave oscillator is of the so-called Gunn diode type. The invention is, however, not limited to the use of this type of micro-wave oscillator and other forms, known per se, of micro-wave oscillator may be used provided that they are not such as to be liable, in operation, to produce bursts of noise of such magnitude as not to be controllable in starting phase by the principle of injection phase priming. Thus, for example, some magnetron micro-wave oscillators are liable to produce very substantial bursts of noise at anode voltages slightly less than that required to start oscillation and such oscillators may not be suitable for use in carrying out this invention.

In a preferred embodiment of the invention a pulsed micro-wave oscillator is connected through a ferrite circulator and a duplexer to a transmitting and receiving radar aerial the received echo signals from which are fed via said duplexer to a mixer to which local oscillations from a stabilised local oscillator are also supplied to produce a required intermediate frequency, a directional coupler being arranged to take off local oscillations from the channel between the local oscillator and the mixer and supply them via said circulator to the resonant circuit or device of the micro-wave oscillator.

The invention is illustrated in the accompanying drawing which shows, in simplified block diagrammatic manner and sufficiently for an understanding thereof, one form of pulsed Doppler radar system embodying the invention.

Referring to the drawing 1 is the pulsed transmitter of the radar system illustrated. It consists of a suitable micro-wave oscillator—e.g. a Gunn diode type of oscillator—with the customary radio frequency resonant circuit 10 (normally a resonant cavity) and is pulsed by pulses from a source 2. It is connected via two of the ports of a three port ferrite circulator 3 to a known duplexer 4 which in turn feeds into a combined transmitting—receiving radar aerial 5. Received echoes from the aerial 5 are fed via the duplexer 4 to a mixer 6 whose second input is provided by a local oscillator 7 to produce a required intermediate frequency output at OUT. This output is processed and utilised (by means not shown) in any desired manner known in pulsed Doppler radar practice. The local oscillator 7 is driven by and stabilised by a reference frequency source 8. Most of the output from the oscillator 7 is fed to the mixer 6 but a minor part of it is fed via a directional coupler 9 to the third port of the circulator 3 which feeds it back to the resonant circuit—normally, as above stated, a resonant cavity—of the micro-wave oscillator at 1.

The operational frequency of the transmitter 1 is adjusted to be equal to the local oscillator plus (or minus) the intermediate frequency. When the micro-wave oscillator is pulsed its oscillation, the frequency and phase are initially determined by the local oscillator frequency present in the resonant cavity 10. As the microwave power output increases to a value much larger than the priming signal from the local oscillator, the transmitter frequency reverts to its normal value and remains at this value for the rest of the pulse. There will, of course, be phase change associated with the commencement of the pulse but since the starting point for this phase change is set by the priming signal from the local oscillator and this will repeat itself exactly for every pulse, the practical requirements for a pulsed Doppler radar system will nevertheless be satisfied.

We claim:

1. A pulsed Doppler radar system including a transmitting and receiving aerial, microwave oscillator means for producing radio frequency pulses, and including frequency determinative resonant means for establishing the radio frequency of said pulses, means connecting said microwave oscillator means and said aerial for the application of said pulses to said aerial, local oscillator means for providing a local oscillation frequency other than the radio frequency of said pulses, means for mixing the local oscillation frequency rom said local oscillator means with received reflected pulses from said aerial to produce an intermediate frequency output and means for applying a portion of the output from said local oscillator means to said resonant means of said microwave oscillator for injection phase priming of said oscillator.

2. The system according to claim 1 wherein said microwave oscillator comprises a Gunn diode type oscillator, said means for applying a portion of the output from said local oscillator means to said resonant means including a circulator having at least three ports and connected into said means connecting said microwave oscillator means and said aerial.

3. The system according to claim 2 wherein said means for applying a portion of the output from said local oscillator means further includes a directional coupler coupled to the output of said local oscillator, said circulator comprising a ferrite circulator connected with said directional coupler, said means connecting said microwave oscillator and said aerial further comprising a duplexer connected with said aerial and said ferrite circulator, and said means for mixing comprising a mixer connected with said duplexer and said local oscillator means for mixing aerial-received signals passed by said duplexer and the output of said local oscillator means.

References Cited

UNITED STATES PATENTS 2,543,449 2/1951 Emslie.

OTHER REFERENCES

Ridenour: Radar System Engineering, McGraw-Hill (1947), p. 636.

CHARLES L. WHITHAM, *Primary Examiner*.

U.S. Cl. X.R.

343—7.7